United States Patent [19]

Mosbach et al.

[11] Patent Number: 4,764,553

[45] Date of Patent: Aug. 16, 1988

[54] WATER SOLUBLE OR DISPERSIBLE POLYURETHANES, A PROCESS FOR THEIR PREPARATION AND THEIR USE FOR COATING SUBSTRATES

[75] Inventors: Jürgen Mosbach, Leverkusen; Josef Pedain; Klaus Noll, both of Cologne, all of Fed. Rep. of Germany

[73] Assignee: Bayer Aktiengesellschaft, Bayerwerk, Fed. Rep. of Germany

[21] Appl. No.: 127,340

[22] Filed: Dec. 1, 1987

[30] Foreign Application Priority Data

Dec. 4, 1986 [DE] Fed. Rep. of Germany ....... 3641494

[51] Int. Cl.$^4$ .............................................. C08G 18/48
[52] U.S. Cl. ................................... 524/591; 524/839; 524/840; 528/71
[58] Field of Search ....................... 524/591, 839, 840; 528/71

[56] References Cited

U.S. PATENT DOCUMENTS

| | | | |
|---|---|---|---|
| 3,412,054 | 11/1968 | Milligan et al. | 260/18 |
| 3,479,310 | 11/1969 | Dieterich et al. | 260/29.2 |
| 3,905,929 | 9/1975 | Noll | 260/29.2 |
| 3,920,598 | 11/1975 | Reiff et al. | 260/29.2 |
| 4,092,286 | 5/1978 | Noll et al. | 260/29.2 |
| 4,237,264 | 12/1980 | Noll et al. | 528/67 |
| 4,408,008 | 10/1983 | Markusch | 524/591 |

FOREIGN PATENT DOCUMENTS 0000347 1/1979 European Pat. Off. .

*Primary Examiner*—Maurice J. Welsh
*Attorney, Agent, or Firm*—Gene Harsh; Joseph C. Gil; Thomas W. Roy

[57] ABSTRACT

The present invention is directed to water dispersible or soluble polyurethanes containing about 0.5 to 30% by weight, based on the weight of the polyurethanes, of ethylene oxide units present in lateral or terminal polyether chains, characterized in that in addition to these ethylene oxide units the polyurethanes contain, as further hydrophilic centers, about 0.1 to 120 milliequivalents, per 100 g of solids content, of carboxylate groups in the form of built-in structural units corresponding to the general formula

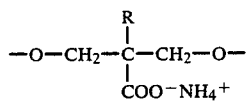

wherein R denotes an alkyl group having 1 to 4 carbon atoms and the total quantity of carboxylate groups and ethylene oxide units present in lateral or terminal chains is calculated to ensure the solubility or dispersibility of the polyurethanes in water.

The present invention also relates to a process for the preparation of these polyurethanes and to their use for coating substrates.

9 Claims, No Drawings

WATER SOLUBLE OR DISPERSIBLE POLYURETHANES, A PROCESS FOR THEIR PREPARATION AND THEIR USE FOR COATING SUBSTRATES

BACKGROUND OF THE INVENTION

1. Field of the Invention

This invention relates to new water soluble or dispersible polyurethanes containing carboxylate groups and ammonium groups as counterions to the carboxylate groups, a process for the preparation of such polyurethanes and the use of these polyurethanes in the form of their aqueous solutions or dispersions as coating compounds for substrates.

2. Description of the Prior Art

Aqueous solutions and dispersions of polyurethanes are known. DE-AS No. 1,495,745, for example, describes inter alia aqueous dispersions of polyurethanes containing carboxylate groups in which in particular ternary ammonium ions based on volatile tertiary amines are used as counterions for the carboxylate groups.

U.S. Pat. No. 3,412,054 describes dispersions of polyurethanes containing carboxylate groups which have only a limited capacity for dilution with water and require the presence of a cosolvent. The number of built-in carboxylate groups required for enabling the polyurethanes to be diluted with water lies in the range of 30 to 112 milliequivalents per 100 g. In the examples given, dimethylethanolamine is the only neutralizing agent used.

Compared with polyurethanes which have been rendered hydrophilic purely by means of ions, polyurethanes which have non-ionic, hydrophilic polyethylene oxide segments built into the polymer structure form dispersions which have improved resistance to water, electrolytes and frost but their thermostability is reduced (DE-OS Nos. 2,314,512, 2,314,513). For the quality level of aqueous polyurethane urea dispersions it has been found particularly advantageous to use a combination of chemically incorporated hydrophilic polyethylene oxide segments with chemically incorporated ionic hydrophilic centers (DE-OS Nos. 2,551,094, 2,651,506, EP-A-000,347). The products obtained were found to have advantages with respect to flow properties, resistance to coagulation by electrolytes and low temperature and resistance to water and solvents.

Apart from Example 11 of DE-AS No. 1,495,745 describing the preparation of dispersions containing ammonium groups as counterions, which are found to be unsatisfactory for practical application, the prior art teaching discloses in particular that for the preparation of aqueous dispersions or solutions of polyurethanes containing carboxylate groups the agents used for neutralizing the carboxylate groups are preferably tertiary amines since the use of a neutralizing agent containing isocyanate reactive groups leads to undesirable side reactions. Thus, for example, in U.S. Pat. No. 4,408,008 (column 9, line 46 to column 10, line 1) it is explicitly recommended to use, as neutralizing agents, amines which do not contain any isocyanate reactive hydrogen atoms.

The advantage of using readily volatile tertiary amines in the preparation of compounds which are rendered hydrophilic by means of ionic groups is due to the fact that the amines are removed by diffusion when the polyurethane dispersions produced by such a process are applied as coatings, with the result that the water-resistance of the coatings is enhanced. The disadvantage of such readily volatile tertiary amines, however, lies in their ecological and toxicological harmfulness.

It was therefore an object of the present invention to provide water-soluble or dispersible polyurethanes containing carboxylate groups in which the following advantages would be combined:

(1) the counterions for the carboxylate groups should be readily volatile so that coatings prepared from the aqueous solutions or dispersions of polyurethanes would be highly water-resistant;

(2) the base of the counterions should be physiologically substantially harmless compared to readily volatile organic amines; and (3) the aqueous solutions or dispersions should be stable in storage but at the same time provide to coatings which are equal in quality to those obtained from known dispersions, i.e. would have superior properties when compared to the coatings obtained from the dispersions according to Example 11 of DE-AS No. 1,495,745.

This problem was solved by providing the polyurethanes according to the invention described below and the process for their preparation.

SUMMARY OF THE INVENTION

The present invention is directed to water dispersible or soluble polyurethanes containing about 0.5 to 30% by weight, based on the weight of the polyurethanes, of ethylene oxide units present in lateral or terminal polyether chains, characterized in that in addition to these ethylene oxide units the polyurethanes contain, as further hydrophilic centers, about 0.1 to 120 milliequivalents, per 100 g of solids content, of carboxylate groups in the form of built-in structural units corresponding to the general formula

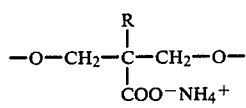

wherein R denotes an alkyl group having 1 to 4 carbon atoms and the total quantity of carboxylate groups and ethylene oxide units present in lateral or terminal chains is calculated to ensure the solubility or dispersibility of the polyurethanes in water.

The present invention also relates to a process for the preparation of such polyurethanes by the reaction of (a) organic polyisocyanates with (b) organic compounds in the molecular weight range of to about 5000 containing at least two isocyanate reactive groups, (c) compounds in the molecular weight range of 32 to 299 acting as chain-lengthening agents or cross-linking agents and having at least two isocyanate reactive groups, (d) components containing ethylene oxide units within polyether chains such as (d1) diisocyanates and/or compounds which are difunctional in isocyanate polyaddition reactions and contain isocyanate reactive hydrogen atoms, which have polyether lateral chains containing ethylene oxide units, (d2) monoisocyanates and/or compounds which are monofunctional in isocyanate polyaddition reactions and contain at least one isocyanate reactive hydrogen atom, which have polyether chains containing ethylene oxide units, and (d3) mixtures of compounds defined under (d1) and (d2), (e) dihydroxymonocarboxylic acids, and optionally (f) organic compounds which are monofunctional in isocyanate polyaddition reactions and contain at least one isocyanate reactive group but are free from ethylene oxide units, the reaction of starting components (a) to (f) being carried out in one or two stages at an equivalent ratio of isocyanate groups to isocyanate reactive groups of about 0 8:1 to 2:1 and in the presence, at least at the end of the reaction, of an isocyanate inert, water-miscible solvent so that a solution of a polyurethane having an isocyanate group content of about 0 to 10% by weight in such a solvent is obtained, followed by at least partial neutralization of the carboxyl groups in the polyurethane, the nature and quantitative proportions of the starting materials and the degree of neutralization being chosen so that the dissolved polyurethane contains about 0.5 to 30% by weight, based on the solids content, of ethylene oxide units built into lateral and/or terminal polyether chains and about 0.1 to 120 milliequivalents of carboxylate groups per 100 g of solids content, the total quantity of these hydrophilic groups being calculated to ensure solubility or dispersibility of the polyurethanes in water, characterized in that the dihydroxycarboxylic acid (e) used is a compound corresponding to the general formula

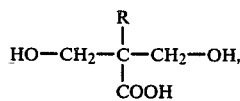

wherein R has the meaning already indicated and the neutralizing agent used for the carboxyl groups is ammonia.

Lastly, the invention relates to the use of aqueous solutions or dispersions of the polyurethanes according to the invention for the formation of coatings on substrates.

DETAILED DESCRIPTION OF THE INVENTION

Within the context of the present invention, the term "polyurethane" includes polyurethane polyureas containing urea groups.

The compounds used as polyisocyanate component (a) for the process according to the invention may be any polyisocyanates known from polyurethane chemistry, generally with molecular weights in the region of 112 to about 1000, preferably about 140 to 400. Suitable examples include polyisocyanates corresponding to the general formula $Q(NCO)_n$ wherein Q denotes an organic group obtainable by the removal of the isocyanate groups from an organic polyisocyanate in the molecular weight range of 112 to about 1000, preferably about 140 to 400, and n has a value of 2 to 4, preferably 2 or 3. Particularly suitable polyisocyanates for the process according to the invention are those corresponding to the general formula in which Q stands for a divalent aliphatic hydrocarbon group with 4 to 18 carbon atoms, a divalent cycloaliphatic hydrocarbon group with 5 to 15 carbon atoms, a divalent aromatic hydrocarbon group with 6 to 15 carbon atoms or an araliphatic hydrocarbon group with 7 to 15 carbon atoms. The following are typical examples: tetramethylene diisocyanate, hexamethylene diisocyanate, dodecamethylene diisocyanate, 2,2,4-trimethyl-hexanediisocyanate, undecane-1,11-diisocyanate, lysine ester diisocyanate, cyclohexane-1,3- and -1,4-diisocyanate, 1-isocyanato-3-isocyanatomethyl3,5,5-trimethyl-cyclohexane, 4,4'-diisocyanato-dicyclohexylmethane or aromatic diisocyanate such as

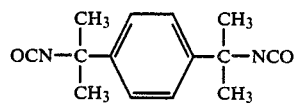

the corresponding 1,3-isomer, 2,4-diisocyanatotoluene and/or 2,6diisocyanatotoluene and 4,4'-diisocyanatodiphenylmethane.

Examples of higher functional polyisocyanates which are frequently added to bring about branching include triisocyanates containing urethane groups which may be obtained by reaction of the diisocyanates exemplified above with sub-equivalent quantities of trifunctional, low molecular weight polyhydroxyl compounds of the type exemplified below optionally followed by removal of excess starting diisocyanate by distillation; polyisocyanates containing isocyanurate groups and obtained by trimerization of the diisocyanates exemplified above: and biuret polyisocyanates based on the exemplified diisocyanates.

Examples of starting components (b) include in particular the relatively high molecular weight polyhydroxyl compounds used in polyurethane chemistry which have molecular weights in the region of 300 to about 5000, preferably about 500 to 3000. Examples include (1) dihydroxypolyesters of dicarboxylic acids such as succinic acid, adipic acid, suberic acid, azelaic acid, sebacic acid, phthalic acid, isophthalic acid, terephthalic acid, tetrahydrophthalic acid, etc. and diols such as ethylene glycol, propane-1,2-diol, propane-1,3-diol, diethylene glycol, butane-1,4-diol, hexane-1,6-diol, octane-1,8-diol, neopentyl glycol, 2-methylpropane-1,3-diol and the various isomeric bis-hydroxymethyl-cyclohexanes; (2) the polylactones used in polyurethane chemistry, e.g. polymers of ε-caprolactone started on the above-mentioned alcohols (3) the known polycarbonates of polyurethane chemistry obtainable, for example, by reaction of the above mentioned diols with diarylcarbonates or phosgene; (4) the known polyethers of polyurethane chemistry, e.g. polymers and copolymers of tetrahydrofuran, styrene oxide, propylene oxide, ethylene oxide, the butylene oxides or epichlorohydrin prepared with divalent starter molecules such as water, the above mentioned diols or amines containing two NH bonds, in particular polymers and copolymers of propylene oxide and optionally ethylene oxide. A certain proportion of ethylene oxide may be used, provided that the resulting polyether diol does not contain more than about 10% by weight of ethylene oxide units. It is preferred to use polyether diols which have been obtained without the use of the ethylene oxide, i.e. in particular from propylene oxide and tetrahydrofuran alone.

In addition to these relatively high molecular weight difunctional compounds, component (b) may contain trifunctional or higher functional polyhydroxyl compounds of the type mentioned, in particular polyether polyols which have molecular weights within the limits mentioned above and have been obtained from or with the inclusion of higher functional starting materials such as trimethylol propane, glycerol or ethylene diamine.

Polyether polyamines within the given molecular weight range may also be used, for example those obtained by conversion of the hydroxyl groups in the exemplified polyether polyols into primary amino groups, but they are less preferred.

The starting components (c) may be any compounds with molecular weights of 299 or less which are at least difunctional in isocyanate addition reactions. They include both compounds which are difunctional in isocyanate addition reactions (chain lengthening agents) and compounds which are at least trifunctional in isocyanate polyaddition reactions (cross-linking agents) as well as any mixtures of such compounds. Examples of suitable starting components (c) include low molecular weight polyhydric alcohols such as ethylene glycol, propylene glycol, tetramethylenediol, hexamethylenediol, glycerol, trimethylolpropane, trimethylolethane and the isomeric hexanetriols and pentaerythritols; low molecular weight diamines such as ethylene diamine, 1,2-and 1,3-diaminopropane, 1,6-diaminohexane, 1,3-diamino2,2-dimethylpropane, isophorone diamine, 1,3- and 1,4-diaminohexane, 4,4'-diamino-dicyclohexylmethane, 4,4'-diamino-3,3'-dimethyl-dicyclohexylmethane, 1,4-bis-(2-amino-prop-2-yl)-cyclohexane and 3,3'- diethyl -4,4'-diamino-dicyclohexylmethane: hydrazine; hydrazides and any mixtures of such diamines and hydrazines; higher functional polyamines such as diethylenetriamine, triethylenetetramine, dipropylenetriamine and tripropylenetetramine; and hydrogenated products of addition of acrylonitrile to aliphatic or cycloaliphatic diamines, preferably products of addition of one acrylonitrile group to 1 molecule of a diamine, e.g. hexamethylene propylene triamine, tetramethylene propylene triamine, isophorone propylene triamine, 1,4- or 1,3-cyclohexanepropylenetriamine, or any mixtures of such polyamines.

Starting components (d) include compounds containing ethylene oxide units built into polyether chains such as (d1) diisocyanates and/or compounds which are difunctional in isocyanate polyaddition reactions and contain isocyanate reactive hydrogen atoms, the diisocyanates and isocyanate reactive compounds having lateral polyether chains containing ethylene oxide units (d2) monoisocyanates and/or compounds which are monofunctional in isocyanate polyaddition reactions and have an isocyanate reactive hydrogen atom, the monoisocyanates and isocyanate reactive compounds having polyether chains containing ethylene oxide units: and (d3) mixtures of (d1) and (d2).

Starting components (d1) include in particular compounds corresponding to the general formula (I)

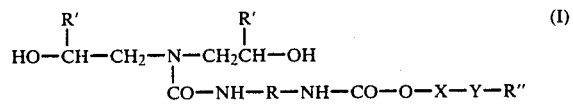

and/or compounds of the general formula (II)

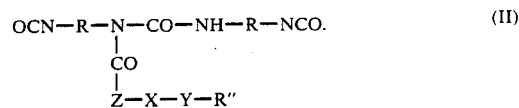

Compounds (d2) include in particular compounds corresponding to the general formula (III)

$$HO-X-Y-R''  \quad (III)$$

or the formula (IV)

$$HR'N-X-Y-R''  \quad (IV)$$

and/or compounds corresponding to the general formula (V)

$$OCN-R-NH-CO-Z-X-Y-R''  \quad (V).$$

In these formulae (I) to (V),
R denotes a divalent group obtainable by removal of the isocyanate groups from a diisocyanate R(NCO)$_2$ of the kind defined above,
R' denotes hydrogen or a monovalent hydrocarbon group with 1 to 8 carbon atoms, preferably hydrogen or a methyl group,
R'' denotes a monovalent hydrocarbon group with 1 to 12 carbon atoms, preferably an unsubstituted alkyl group with 1 to 4 carbon atoms,
X denotes a group obtained by removal of the terminal oxygen atom from a polyalkylene oxide chain which has about 5 to 90, preferably about 20 to 70 chain members of which at least about 40%, preferably at least about 65% are ethylene oxide units, which chain may also contain propylene oxide, butylene oxide or styrene oxide units in addition to the ethylene oxide units, propylene oxide being preferred among these latter three mentioned oxides,
Y denotes oxygen or NR''' in which R''' has the same meaning as R'', and
Z denotes —NH— or a group conforming to the definition of Y.

These hydrophilic starting components (I) to (V) are prepared by methods analogous to those of U.S. Pat. Nos. 3,920,598, 3,905,929, 4,190,566 and 4,237,264.

The compounds used as starting components e) may be 2,2-bis-(hydroxymethyl)-alkane monocarboxylic acids having a total of 5 to 8 carbon atoms, i.e. compounds corresponding to the general formula

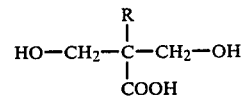

wherein
R denotes an alkyl group with 1 to 4 carbon atoms. 2,2-Dimethylolpropionic acid is a particularly preferred starting component (e).

The optional starting components (f) include compounds which are free from ethylene oxide units, contain isocyanate reactive groups and are monofunctional in isocyanate polyaddition reactions. The term "monofunctional in isocyanate addition reactions" applies in this context also to compounds which purely theoretically have more than one isocyanate reactive group but in which one of these groups is distinctly more isocyanate reactive than the others so that as a first approximation these compounds react selectively as monofunctional compounds.

The starting components (f) may also include monohydric alcohols or amines in the molecular weight range of 31 to about 200 such as methanol, ethanol, propanol, isopropanol, cyclohexanol or cyclooctanol; N,N-dimethylethanolamine, methyl-, ethyl-, propyl- and isopropylamine, cyclohexylamine, cyclooctylamine and diethylamine; and amino alcohols such as ethanolamine, diethanolamine, propanolamine or aminoethylpropanol.

The last mentioned amino alcohols containing hydroxyl groups belong to the above-mentioned compounds which contain two isocyanate reactive groups but as a first approximation react as monofunctional compounds. Relatively high molecular weight compounds acting as chain breaking agents, such as saturated and unsaturated fatty alcohols, fatty amines or fatty acids could in principle also be used, e.g. stearylamine, oleylamine, stearyl alcohol, oleyl alcohol, stearic acid and oleic acid.

The monofunctional starting components (f) also include the blocking agents for isocyanate groups commonly used in polyurethane chemistry, e.g., ε-caprolactam; oximes such as acetone oxime, butanone oxime or cyclohexanone oxime; and CH-acidic compounds such as diethylmalonate, ethyl acetoacetate or 2,4-pentanedione. Starting components (f) may sometimes be used in the process according to the invention to bring about chain breaking.

The optional auxiliary agents and additives (g) include the known catalysts used in polyurethane chemistry for isocyanate polyaddition reactions, plasticizers, fillers and pigments which may not only be added to the polyurethanes after the latter have been prepared but may be introduced with the starting components to facilitate thorough mixing with the polyurethanes.

The process of preparation of the polyurethanes from the starting components (a) to (f) is carried out in known manner in one or more stages, using the reactants in such proportions that the equivalent ratio of isocyanate groups from component (a) and optionally component (d) to isocyanate reactive groups from components (b), (c), (e), (f) and optionally (d) is within the range of about 0.8:1 to 2:1, preferably about 0.95:1 to 1.5:1, and most preferably about 0.95:1 to 1.2:1, component (f) always being included in the calculation as a monofunctional component.

The calculation of this equivalent ratio does not include the carboxyl groups of component (e) nor the water used for the preparation of solutions or dispersions of polyurethanes nor the ammonia used for neutralization of the carboxyl groups.

Component (c) is generally used in a quantity of about 1 to 80% by weight, preferably about 5 to 70% by weight, based on the weight of component (b).

Component (d) is used in the quantity required to provide about 0.5 to 30% by weight, preferably about 1 to 20% by weight of ethylene oxide units within lateral and/or terminal polyether chains in the polyurethane finally obtained according to the invention.

The quantity of component (e) and the degree of neutralization of the carboxyl groups incorporated with component (e) are calculated to provide about 0.1 to 120, preferably about 1 to 80 milliequivalents of carboxylate groups per 100 g of solids content in the polyurethane finally obtained, but at the same time the total quantity of these carboxylate groups and the aforementioned ethylene oxide units must be within the ranges mentioned above to ensure that the polyurethanes will be soluble or dispersible in water.

The nature and proportions of starting components (a) to (e) are furthermore chosen so that at the end of the reaction of these starting materials, the polyurethanes obtained will contain not more than about 10% by weight, preferably not more than about 5% by weight of free, unreacted isocyanate groups, based on the solids content.

The optional monofunctional starting components (f) are used, if at all, preferably not more than in the quantity corresponding to the quantity of free isocyanate groups which may theoretically be present after the reaction of starting components (a) to (e).

Starting components (a) to (f) may be reacted together in one or more stages but whichever method is employed a water-miscible solvent which is inert towards isocyanate groups must be used at least at the end of the reaction, so that the reaction products are obtained in the form of a solution in such a solvent. The term "solution" is used to denote both true solutions and water-in-oil emulsions which may be formed, for example, if one or more of the starting components are used in the form of an aqueous solution. The solvents which may be used include acetone, methyl ethyl ketone, N-methyl-pyrrolidone or any mixtures of such solvents. The quantity of solvent used is generally calculated to form about 10 to 70% by weight solutions of the reaction products of starting components (a) to (f) in the solvent, excluding the weight of any additives (g) used in the process.

When the process according to the invention is carried out in a single stage, the starting components containing isocyanate reactive groups are preferably mixed together and then reacted with the starting components containing isocyanate groups, preferably initially at a temperature of about 50° to 150° C. in the absence of solvent and optionally in the presence of known catalysts. The nature and quantitative proportions of the starting components are preferably chosen to provide an equivalent ratio of isocyanate groups to isocyanate reactive groups within the range of about 0.8:1 to 1.05:1. Starting components (f) are used only if the reaction mixture contains an excess of isocyanate groups compared with the other starting components. One of the above mentioned solvents is gradually added as the viscosity of the mixture rises during the course of the reaction. An organic solution of the polyurethane end product is finally obtained, and the concentration of this solution is adjusted to a solids content of about 10 to 70% by weight, in particular about 15 to 55% by weight.

When a two-stage process is employed, an isocyanate prepolymer is preferably first prepared in the melt at about 50° to 150° C. from excess quantities of isocyanate-containing starting components (a) and optionally (d) and hydroxyl containing starting components (b), (c), (e) and optionally (d) and (f), maintaining an NCO/OH equivalent ratio in the range of about 1.1:1 to 3.5:1, preferably about 1.2:1 to 2.5:1, in the presence or absence of a solvent of the type exemplified above. If no solvent has been used, this isocyanate prepolymer is subsequently taken up in a solvent of the type exemplified. The resulting solution is then reacted with a further portion of chain-lengthening or cross-linking agents (c) which are optionally added in the form of aqueous solutions, optionally with the addition of monofunctional starting components (f). The compounds used as component (c) are preferably components of the type exemplified containing primary and/or secondary amino groups. The quantity of starting components (c) and (f) used in this second stage is so calculated that the equivalent ratio of all the starting components used in the first and second stage will conform to the figures given above and that the equivalent ratio of isocyanate groups to isocyanate reactive groups will always be at least about 1:1 when monofunctional starting components (f) are used.

In both variations of the process (single stage or two stage), the end products obtained are solutions of the reaction products in the above-mentioned solvents with a solids content within the ranges indicated above.

Preparation of the solutions is followed by the addition of ammonia in an amount at least sufficient for partial neutralization of the carboxyl groups and if solutions or dispersions in water are to be prepared immediately, then water for dispersion is also added, in which case the ammonia may be added before, during or after the addition of water. If the organic solution of the reaction products of (a) to (f) still contains free isocyanate groups and if ammonia is added before or together with water, for example the water for dispersion (so that the free isocyanate groups have no opportunity to react with the water for dispersion), then the quantity of ammonia must be sufficient not only for the desired degree of neutralization but also for "neutralization" of the remaining free isocyanate groups with chain breaking. When monofunctional starting components (f) are used, the amount of free isocyanate groups present in the above described solutions of reaction products of (a) to (e) and (f) is generally 0 to about 3% by weight, preferably 0 to about 1% by weight, based on the solids content; whereas, when no starting components (f) are used, then the free isocyanate content is generally 0 to about 10% by weight, preferably 0 to about 5% by weight, based on the solids content.

The ammonia used for neutralization may be gaseous or in the form of compounds from which ammonia is split off, such as urotropine or ammonium carbonate. It is preferred, however, to use aqueous ammonia solutions.

After the water has been added as solvent or dispersing agent in a quantity to form solutions or dispersions at concentrations of about 10 to 60% by weight, preferably about 20 to 45% by weight, the bulk of auxiliary solvent used may be removed by distillation.

The polyurethanes according to the invention are finally obtained in the form of aqueous solutions or in the form of aqueous dispersions in which the average particle diameter is in the range of about 10 to 1000 nm, preferably about 30 to 500 nm.

The question as to whether the product will be obtained in the form of an aqueous solution or a dispersion depends primarily on the concentration of hydrophilic segments.

The starting materials used for the process according to the invention may quite well include substantial quantities of trifunctional and polyfunctional components, in particular cross-linking agents (c) so that not only polyurethanes with a substantially linear structure, but also highly branched polyurethanes may be obtained. The preparation of such branched polyurethanes is enhanced in particular if the average molecular weight of the polyurethanes is kept sufficiently low by the addition of monofunctional chain breaking agents (f) to prevent any problems of viscosity and stability arising.

The aqueous solutions and dispersions of the polyurethanes according to the invention are frostresistant and stable in storage and can be diluted with water in any proportions. If urea end groups (reaction of terminal isocyanate groups with ammonia) or masked isocyanate groups (use of masking agents) are present in starting component (f), then the polyurethanes obtained have reactive centers which can easily be used for cross-linking reactions. Terminal urea groups, for example, may be reacted with formaldehyde to form methylol groups which may then react with suitable cross-linking agents to undergo cross-linking, for example with melamine resins. Polyurethanes according to the invention containing masked isocyanate groups are capable of undergoing thermal and chemical cross-linking reactions. In either case, exceptionally high quality coatings can be obtained from suitable polyurethanes according to the invention by subjecting them to suitable after-treatments after they have been used according to the invention.

The solutions or dispersions of the polyurethanes according to the invention may be shaped at any time after they have been prepared. They generally form dimensionally stable plastics coatings directly after drying.

The polyurethanes obtained vary in their properties according to the selected chemical composition and the urethane group content. Soft thermoplastic and rubbery elastic products with varying degrees of hardness up to duroplasts with a glassy hardness can be obtained. The hydrophilic character of the products may also vary within wide limits. Elastic products can be worked up thermoplastically at elevated temperatures, for example at about 100° to 180° C., provided they are not chemically cross-linked.

The products of the process are suitable for coating, covering or impregnating woven and non-woven textiles, leather, paper, wood, metals, ceramics, stone, concrete, bitumen, hard fibers, straw, glass, porcelain, synthetic resins of various kinds and glass fibers to produce anti-static and crease-resistant finishes; as binders for non-woven webs; as adhesives, adhesifying agents and laminating agents: as hydrophobicizing agents and plasticizers; and as binders, e.g., for cork powder or wood powder, glass fibers, asbestos, paper type materials, plastics or rubber waste and ceramic materials; as auxiliary agents in cloth printing and in the paper industry; as additives for polymers; as sizing agents, for example for glass fibers; and for finishing leather.

The dispersions may be blended with other ionic or non-ionic dispersions such as polymer or copolymer dispersions of polyvinyl acetate, polyethylene, polystyrene, polybutadiene, polyvinyl chloride or polyacrylate. Known emulsifiers which are not chemically fixed and are preferably ionic may also be added although they are, of course, not essential.

The usual auxiliary agents and additives may be added to the dispersions for their use according to the invention. These include cross-linking agents such as carbodiimides, masked diisocyanates, partially or completely etherified melamine resins, pigments, metallic pigments based on aluminum flakes, fillers such as carbon black, silica, talc, kaolin, titanium dioxide, glass in the form of powder or fibers, or cellulose or cellulose acetobutyrate. Additives may also be used to lower the film-forming temperature and achieve controlled delay in drying, namely coalescence dissolvers such as diacetone alcohol, butyl glycol, N-methylpyrrolidone, 1-methoxypropanol. cyclohexanone, ethylene glycol monobutylether or diethylene glycol monobutylether. These additives, however, should only be used in small quantities (less than about 10% by weight, based on the dispersion).

The dispersions may be applied by any suitable method for the formation of coatings, e.g. they may be applied with rollers or applicator knives or by spread coating, casting, spraying or dipping.

The products obtained by these various methods of application may be dried at room temperature or at elevated temperatures.

The percentages given in the following examples are all percentages by weight, and all parts are parts by weight.

EXAMPLES

EXAMPLE 1

620.5 parts of a polyester with OH number 66 obtained from adipic acid and hexane-1,6-diol and 2,2-dimethylpropane-1,3-diol (diol molar ratio 0.65:0.35) were mixed with 36 parts of butane-1,4-diol, 43 parts of a monofunctional polyether alcohol with OH number 26 prepared by the alkoxylation of n-butanol with a mixture of 83% ethylene oxide and 17% propylene oxide, 50.3 parts of 2,2-dimethylolpropionic acid and 13.4 parts of trimethylolpropane. The mixture was reacted with 488.4 parts of 3-isocyanatomethyl-3,5,5-trimethylcyclohexylisocyanate (IPDI) at 70° to 110° C. until the isocyanate content of the resulting isocyanate prepolymer had fallen to about 5.3% (NCO/OH equivalent ratio 1.69:1).

The prepolymer obtained was dissolved in 2000 parts of acetone, and a solution of 28.5 parts of ethylene diamine and 10.3 parts of diethylene triamine in 500 parts of deionized water was added at room temperature (NCO/OH+NH ratio=1.14). After the mixture was stirred for 15 minutes, 62.2 g of a 25% ammonia solution were stirred in so that the measured pH of the reaction mixture was then 7. 1879 g of deionized water were then added within 15 minutes at about 30° C. after a further 30 minutes stirring.

An opaque, bluish dispersion of the solid substance in an acetone/water mixture was obtained. The acetone was removed quantitatively from this mixture by distillation at reduced pressure.

A pure, aqueous dispersion with a solids content of 35% was obtained. Characteristic data (based on the solids content):
$CO_2-$: 28.0 milliequivalents per 100 g
EOx: 2.73% by weight
Data for practical application:
Outflow time (DIN-4 cup): 20 sec
pH: 7.6.

A clear film about 35 μm in thickness prepared at room temperature from this dispersion had a pendulum hardness according to DIN 53157 of 170 seconds after hardening at room temperature for 24 hours. The film hardness remained unchanged after 6 hours' exposure to water.

EXAMPLE 2

306.6 parts of a polyester with OH number 133 obtained from adipic acid and hexane-1,6-diol were mixed with 51.8 parts of butane-1,4-diol, 21.5 parts of the monohydric polyether alcohol from Example 1 and 47.6 parts of 2,2-dimethylolpropionic acid. This mixture was reacted with 488.4 parts of IPDI at 70° to 110° C. until the isocyanate content had fallen to about 7.4% (NCO/OH equivalent ratio: 1.69).

The prepolymer obtained was dissolved in 1300 parts of acetone. A chain lengthening solution of 51 parts of ethylene diamine and 500 parts of deionized water was added at room temperature (NCO/OH+NH ratio: 1.02). The reaction mixture was stirred for 5 minutes and 24.14 g of a 25% ammonia solution were then stirred in. After a further 10 minutes stirring, 1288.7 g of deionized water were added within 5 minutes. After removal of the acetone by distillation, an opaque blue 35% dispersion was obtained. Characteristic data (based on the solids content):
$CO_2-$: 12.8 milliequivalents per 100 g
EOx: 1.8% by weight
Outflow time (DIN-4 cup): 29 sec
pH: 7.43
Pendulum hardness: 135 sec (DIN 53157)

EXAMPLE 3

Reaction mixture:
306.6 parts of polyester as in Example 2
6.44 parts of monohydric polyether alcohol as in Example 1
97.15 parts of dimethylolpropionic acid
466.20 parts of IPDI
2500 parts of acetone
48.0 parts of ethylene diamine
700 parts of water
72.54 parts of 25% ammonia solution
1445 parts of water
Method: See Example 2.

A colloidal, transparent solution with a solids content of 30% was obtained after removal of the acetone by distillation. Characteristic data (based on the solids content):
$CO_2-$: 69 milliequivalents per 100 g
EOx: 0.57% by weight
Outflow time (DIN-4 cup): 40 sec
pH: 6.9
Pendulum hardness (DIN 53 157): 192 sec

EXAMPLE 4

Reaction mixture:
650 parts of polypropylene glycol (OH number 56, molecular weight 2000)
86 parts of monohydric polyether alcohol as in Example 1
48.9 parts of dimethylolpropionic acid
40.5 parts of butane-1,4-diol
333 parts of IPDI
114.8 parts of hexamethylene diisocyanate
3000 parts of acetone
24 parts of ethylene diamine
17.5 parts of hydrazine hydrate
380 parts of water
64.26 parts of 25% $NH_3$ solution
1544 parts of water The aqueous dispersion was prepared by the method described in Example 1. A white, 40% dispersion with a strong blue tinge was obtained. The films obtained from this dispersion were transparent, soft and highly elastic. Characteristic data (based on the solids content):

$CO_2-$: 27.9 milliequivalents per 100 g
EOx: 5.43%
Outflow time (DIN-4 cup): 18 sec
pH: 6.9
Pendulum hardness (DIN 53157): 10 sec

EXAMPLE 5

Reaction mixture:
147 parts of polyester from Example 2
200 parts of polypropylene glycol from Example 4
268.75 parts of monohydric polyether alcohol from Example 1
6.7 parts of dimethylol propionic acid
40.5 parts of butane-1,4-diol
288.6 parts of IPDI
123.0 parts of HDI
3600 parts of acetone
18 parts of ethylene diamine
15 parts of hydrazine hydrate
350 parts of water
86.7 parts of 25% $NH_3$ solution
1246.3 parts of water.

The procedure was as described in Example 1. The product obtained after removal of the acetone by distillation was a very finely divided dispersion which formed a clear, very soft, elastic film after evaporation of the water. Characteristic data (based on the solids content):

$CO_2-$: 4.5 milliequivalents per 100 g
EOx: 20.1% by weight
pH: 8.7
Outflow time (DIN-4 cup): 38 sec
Shore A hardness: 45

EXAMPLE 6

An isocyanate prepolymer was prepared as described in Example 1 from
552.5 parts of the polyester described in Example 1,
26.8 parts of the polyether described in Example 1,
13.4 parts of trimethylolpropane,
46.9 parts of dimethylolpropionic acid,
27.0 parts of butane-1,4-diol and
510.6 parts of IPDI.

The components were reacted until an isocyanat value of about 7.6% had been obtained and the reaction mixture was then dissolved in 3000 parts of acetone. The product was then chain lengthened with a solution of 27.0 parts of ethylene diamine in 500 g of water at room temperature for 10 minutes to form a reaction product having an isocyanate content of about 4.5%. 104.4 g of butanone oxime were then added within 30 minutes and the reaction mixture, which still had an isocyanate group content of 0.8%, based on the solids content, was maintained at 50° C. for 1.5 hours. After the mixture had cooled to 40° C., 18.71 parts of a 25% ammonia solution were added and the mixture was stirred for 45 minutes.

Dispersion was then carried out with 1925.0 g of deionized water at 40° C. for 5 minutes. The white, slightly bluish mixture of acetone and water obtained was freed from acetone by distillation. An aqueous dispersion with a solids content of 35% was obtained. This dispersion was capable of forming clear, very hard films. The theoretical content in masked isocyanate groups was 8.0%. The viscosity of the dispersion immediately after its preparation was 19 s (DIN-4 cup) and was unchanged after 14 days storage at room temperature.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water-soluble or dispersible polyurethane containing about 0.5 to 30% by weight, based on the weight of the polyurethane, of chemically incorporated, hydrophilic ethylene oxide units arranged in lateral and/or terminal polyether chains to said polyurethane, and about 0.1 to 120 milliequivalents, per 100 g of solids content, of chemically incorporated carboxylate groups corresponding to the formula

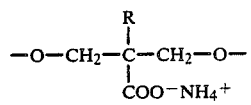

wherein R denotes an alkyl group with 1 to 4 carbon atoms and said hydrophilic ethylene oxide units and said carboxylate groups are present in an amount sufficient to ensure the solubility or dispersibility of said polyurethane in water.

2. The polyurethane of claim 1 wherein said alkyl group is a methyl group.

3. A process for the preparation of a water-soluble or dispersible polyurethane which comprises
   (a) an organic polyisocyanate with
   (b) an organic compound having a molecular weight of 300 to about 5000 and at least two isocyanate reactive groups,
   (c) a chain lengthening agent or cross-linking agent comprising a compound having a molecular weight of 32 to 299 and at least two isocyanate reactive groups,
   (d) a component containing ethylene oxide units within polyether chains comprising a member selected from the group consisting of
      (1) diisocyanates having lateral polyether chains containing ethylene oxide units and compounds containing isocyanate reactive groups which are difunctional in isocyanate polyaddition reactions and having lateral polyether chains containing ethylene oxide units,
      (2) monoisocyanates having polyether chains containing ethylene oxide units and compounds containing one isocyanate reactive group which are monofunctional in isocyanate polyaddition reactions and having polyether chains containing ethylene oxide units, and
      (3) mixtures of (1) and (2),
   (e) a dihydroxymonocarboxylic acid corresponding to the formula

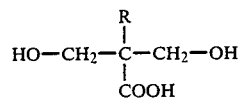

wherein R is an alkyl group having 1 to 4 carbon atoms,
   (f) optionally an organic compound which contains one isocyanate reactive group, is monofunctional in isocyanate polyaddition reactions and is free from ethylene oxide units,
in at least one stage at an equivalent ratio of isocyanate groups to isocyanate reactive groups of about 0.8:1 to 2:1, conducting at least a portion of the last stage of said reaction in the presence of an isocyanate inert, water-miscible solvent to produce a polyurethane having an isocyanate group content of 0 to about 10% by weight and subsequently converting at least a portion of the carboxyl groups present to carboxylate groups with ammonia, said starting materials being selected such that said polyurethane contains about 0.5 to 30% by weight, based on the solids content, of chemically incorporated hydrophilic ethylene oxide units arranged in lateral and/or terminal polyether chains and about about 0.1 to 120 milliequivalents of carboxylate groups per 100 g of solids content, wherein said hydrophilic ethylene units and said said carboxylate groups are present in an amount sufficient to ensure the dispersibility or solubility of said polyurethane.

4. The process of claim 3, wherein said ammonia is in the form of an aqueous solution.

5. The process of claim 3, wherein R is a methyl group.

6. The process of claim 4, wherein R is a methyl group.

7. The process of claim 3, which comprises adding water to said solution before, during or after the addition of ammonia and optionally subsequently removing at least a portion of said solvent by distillation.

8. The process of claim 6, which comprises adding water to said solution before, during or after the addition of ammonia and optionally subsequently removing at least a portion of said solvent by distillation.

9. A coated substrate prepared from the water-soluble or dispersible polyurethane of claim 1.

* * * * *